United States Patent
Harvey

[15] 3,665,831
[45] May 30, 1972

[54] FOLDING CAMERA
[72] Inventor: Donald M. Harvey, Webster, N.Y.
[73] Assignee: Eastman Kodak Company, Rochester, N.Y.
[22] Filed: Feb. 1, 1971
[21] Appl. No.: 111,468

[52] U.S. Cl. ...................................................95/39
[51] Int. Cl. .................................................G03b 17/04
[58] Field of Search...................................95/39

[56] References Cited

UNITED STATES PATENTS

| | | | |
|---|---|---|---|
| 2,880,659 | 4/1959 | Land | 95/39 X |
| 598,569 | 2/1898 | Meyer | 95/39 |
| 3,418,907 | 12/1968 | Bellows | 95/39 |

FOREIGN PATENTS OR APPLICATIONS

| | | | |
|---|---|---|---|
| 22,346 | 11/1899 | Great Britain | 95/39 |
| 1,730 | 1/1892 | Great Britain | 95/39 |
| 15,873 | 12/1886 | Great Britain | 95/39 |

Primary Examiner—Samuel S. Matthews
Assistant Examiner—Monroe H. Hayes
Attorney—W. H. J. Kline and J. Addison Mathews

[57] ABSTRACT

A folding camera is provided with a lens support door hinged at one end to the camera housing and supporting the camera lens at its opposite end. A novel two-piece strut connects the door to the housing and is located inside a following bellows. The strut is spring biased toward an extended locked condition at which it accurately and positively holds the door in a predetermined open position to locate the lens in proper operative relation to the camera film. Finger pressure applied to an indicated spot on the flexible bellows releases the extended strut to allow the door to be closed.

6 Claims, 8 Drawing Figures

Patented May 30, 1972

DONALD M. HARVEY
INVENTOR.

BY *J. Addking Mathew*
*W. H. J. Kline*
ATTORNEYS

Patented May 30, 1972

DONALD M. HARVEY
INVENTOR.

BY J. Addingmathews
W.H.J.Kline
ATTORNEYS

Patented May 30, 1972

DONALD M. HARVEY
INVENTOR.

BY
ATTORNEYS

FOLDING CAMERA

BACKGROUND OF THE INVENTION

1. Field of the Invention

The present invention relates to photographic cameras and more particularly to means for accurately and positively establishing the operative position of the lens of a folding bellows-type camera having a hinged door by which the lens is supported.

2. Description of the Prior Art

A folding camera of the type to which the present invention is directed comprises a box-like housing provided with a lens support door hinged with one end to the housing and supporting the camera lens at its opposite end. A folding bellows extends between the housing and the door and permits the latter to be moved between a closed position and an open position at which the lens is located in operative image-forming relation to the camera film. In previously known cameras of this type, the open or operative position of the camera door has been established by means of one or more linkage members adapted to lock in an extended condition to locate the door in that position. To avoid interference with the folding of the bellows and to permit manual releasing of the locked linkage members, those members heretofore generally have been located outside the camera bellows; thereby detracting from the appearance of the camera and requiring the linkage components to be finished more nicely than would be necessary if they were concealed within the bellows.

SUMMARY OF THE INVENTION

The principle objects of the invention are to enhance the appearance and to simplify the construction and operation of a folding camera provided with a hinged cover door that supports the camera lens and also to improve the accuracy and positiveness with which the lens is located in operative image-focusing relation to the camera film. Briefly, these and other related objects of the invention are accomplished by providing such a camera with a novel two-piece strut connecting the door and the housing and located inside the folding camera bellows. The strut is spring biased toward an extended locked condition at which it accurately and positively holds the door in a predetermined open position to locate the lens in proper operative relation to the camera film. Finger pressure applied to an indicated spot on the flexible bellows folds the extended strut sufficiently to overcome its locking action to enable the door to be closed.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE ILLUSTRATIVE PREFERRED EMBODIMENT

Figure 4:
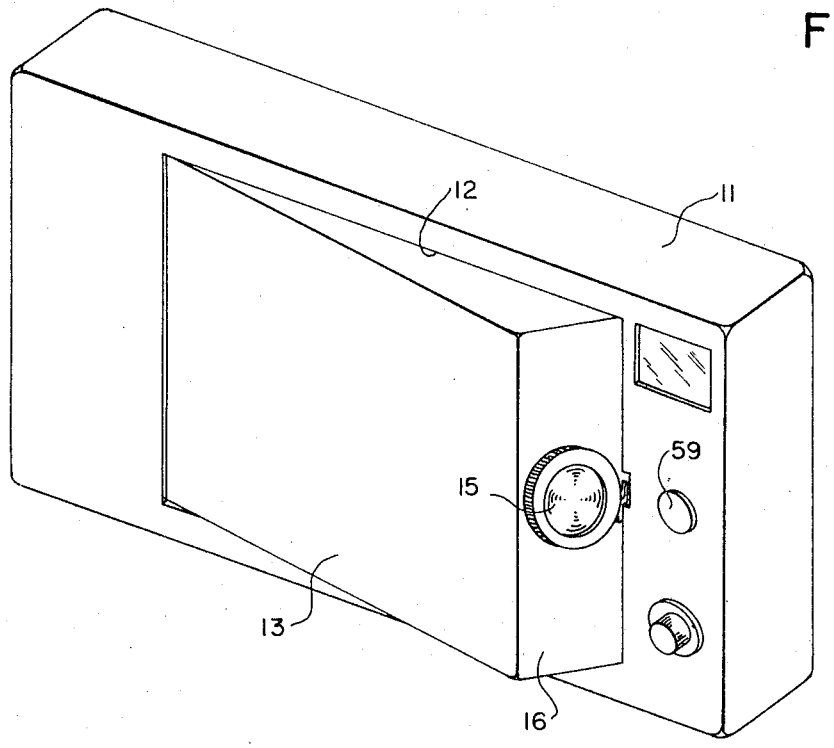
FIG. 4 is a perspective view of the illustrative camera with its lens support door completely closed.

The camera depicted in the accompanying drawings as an illustrative preferred embodiment of the invention is of the self-processing type and comprises a box-like housing 11 having a forwardly facing opening 12 provided with a movable lens support door 13. The lens support door is mounted to the housing by a hinge 14 for movement between an open or operative position shown in FIGS. 1 and 2 and a closed position shown in FIG. 4. The camera lens 15 and its shutter, not shown, are carried by the sloped end portion 16 of door 13 opposite hinge 14. If desired, the lens can be mounted in a threaded support sleeve or the equivalent to provide focusing adjustment of the lens along its axis, as is well known in the camera art.

Figure 2:
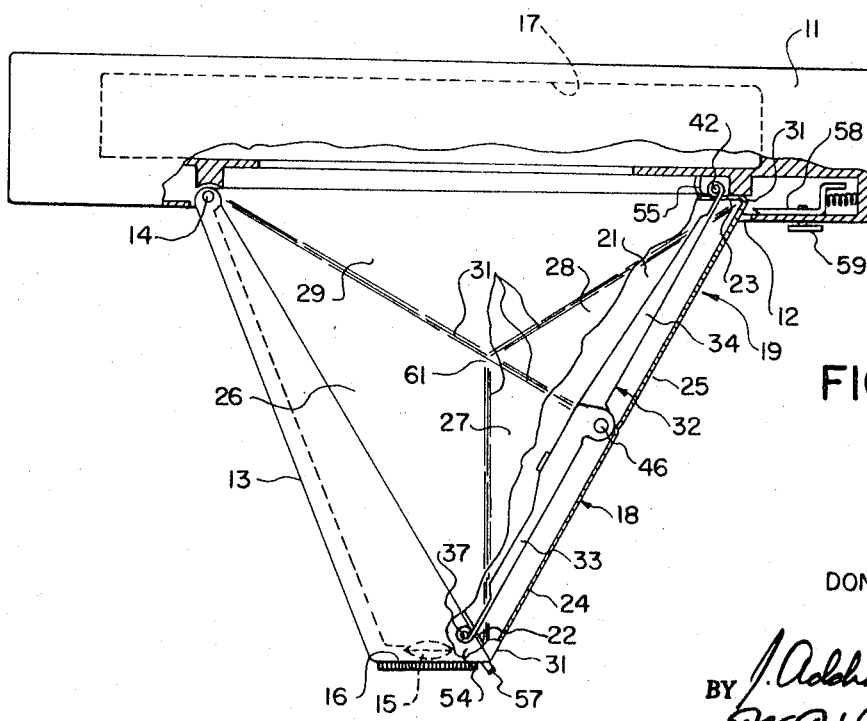
FIG. 2 is a plan view depicting the door of the illustrative camera in open condition and partially broken away and cross sectioned to show the strut member and other internal details of the camera.

When the lens support door is in its open or operative position, the lens is located in image-focusing relation to the photosensitive surface of a film sheet carried by a self-processing film pack 17 supported within the camera housing as shown in FIG. 2. The film pack itself does not comprise a part of the present invention and need not be described further inasmuch as specific details of such film packs are well known or readily available. Although the invention is particularly appropriate for use in self-processing cameras employing film packs or film magazines, it will be apparent that the invention is equally applicable to other types of cameras, e.g. conventional or self-processing cameras loaded with roll film.

The lens support door is connected to the camera housing by a collapsible light-tight bellows 18 which is generally similar to analogous bellows disclosed in various prior art patents relating to folding cameras, for example U.S. Pat. No. 2,880,659, issued to E. H. Land et al on Apr. 7, 1959. Briefly, the bellows includes a rectangular end wall 19 flexibly joined to substantially identical triangular top and bottom walls 20 and 21. Along its forward and rearward edges, the bellows is provided with respective forward and rearward lips 22 and 23, by which it is cemented or otherwise connected in light-tight relation to the camera door and housing as shown in FIG. 2. The end wall of the bellows comprises two relatively stiff rectangular sections 24 and 25 and each of the top and bottom walls similarly comprises four relatively stiff triangular sections 26 through 29. All of the relatively stiff bellows sections are connected to each other and to the bellows mounting lips by light-tight flexible connecting or joining walls 31 which allow the bellows to fold to a flat collapsed condition in the manner best illustrated by FIG. 3, which shows the bellows during the process of opening or closing the camera door. The bellows preferably is made in one piece by injection molding or pressure forming from an appropriate opaque flexible plastic material, but it obviously could also be made in the conventional manner by cementing stiffening members to a piece of flexible opaque fabric.

Figure 1:
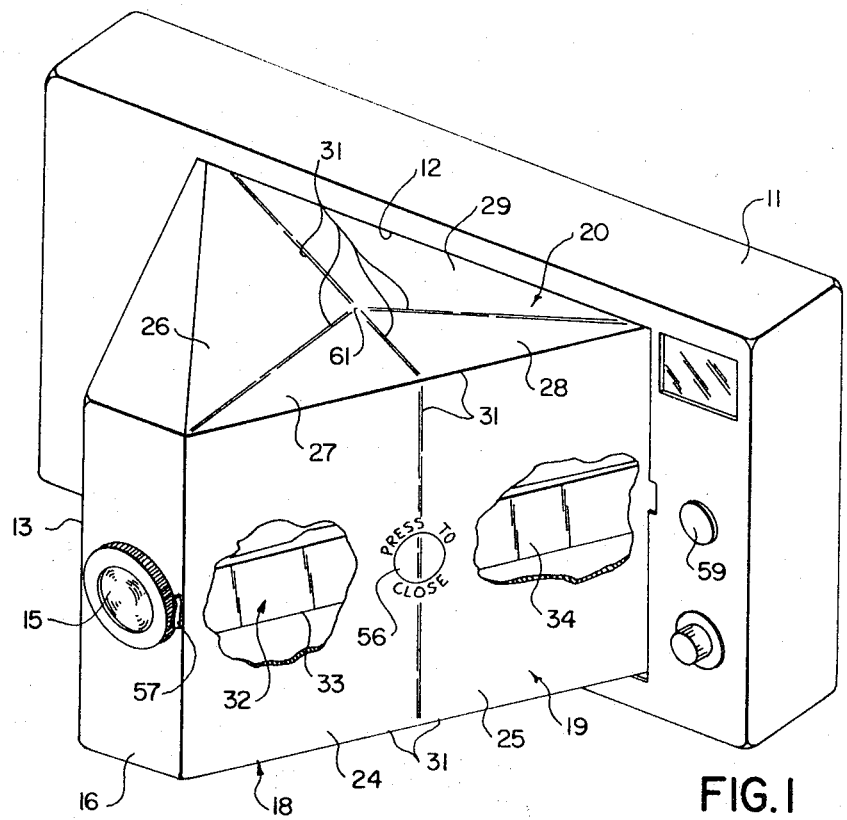
FIG. 1 is a perspective view of a folding camera according to a preferred embodiment of the invention with its hinged lens support door illustrated in its open or operative position and with its bellows partially broken away to show the novel internal strut member that accurately and positively establishes the operative position of the door.
Figure 5:
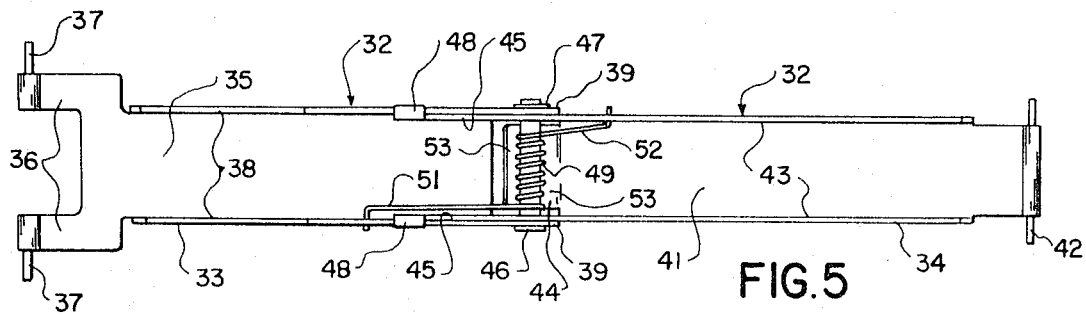
FIG. 5 is an elevational view of the strut member in its extended condition.
Figure 6:
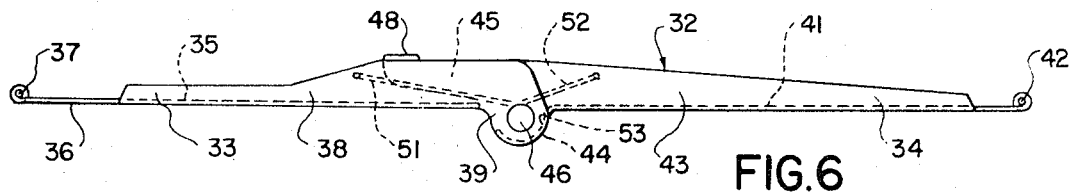
FIG. 6 is a plan view of the strut member in its extended condition illustrated in FIG. 5.
Figure 7:
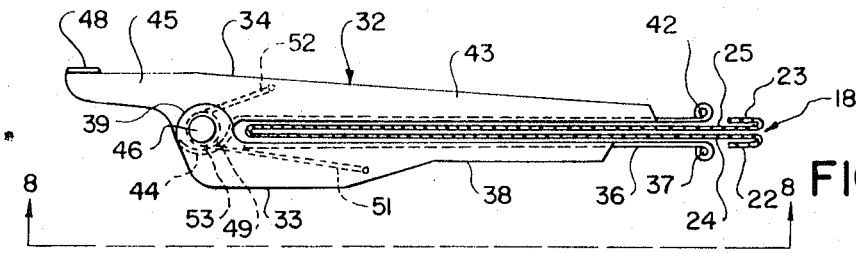
FIG. 7 is a plan view of the strut member in its fully collapsed condition, showing a portion of the end wall of the bellows folded between the two legs of the strut member.
Figure 8:
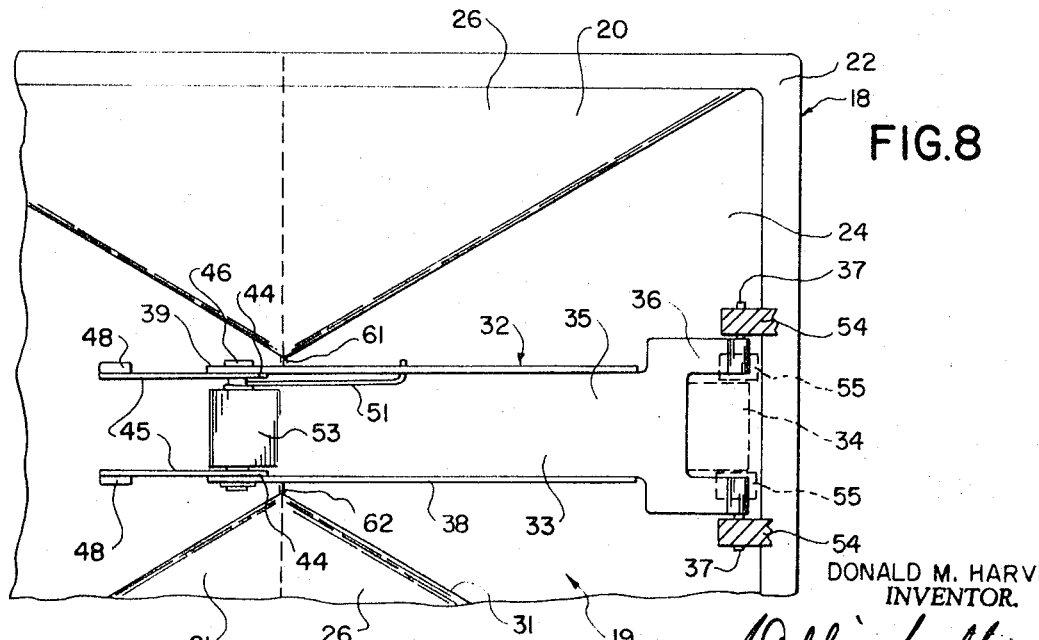
FIG. 8 is an elevational view of the fully collapsed strut member and the adjacent portion of the folded camera bellows.

The support strut 32 to which the invention is specifically directed is illustrated in greatest detail in FIGS. 5 through 8 and is also shown installed within the camera bellows in FIGS. 1 and 2. The strut comprises a front leg 33 and a back leg 34, both of which are preferably made of sheet metal. The front leg includes a flat central web 35 which is bifurcated at one end to provide a pair of hinge fingers 36, the ends of which are rolled to provide the bearings which receive hinge pins 37. Stiffening flanges 38 are bent rearwardly from the edges of the central leg web 35 and extend beyond the end of the web opposite hinge pins 37 to provide a pair of forwardly projecting pivot support ears 39. The back leg 34 likewise comprises a central web 41 rolled at one end to hinge pin 42 and including stiffening flanges 43 which provide the opposite end of the leg with forwardly extending pivot support ears 44 and with blocking tongues 45. The back strut leg is somewhat narrower than the front leg so that pivot support ears 39 straddle pivot support ears 44 as best shown in FIGS. 5 and 8.

A pivot pin 46 extends through corresponding pivot holes in ears 39 and 44 and is held in place by a resilient locking ring 47 to provide a central hinge between the two strut legs. Blocking tongues 45 are straddled by the stiffening flanges of the front strut leg and are provided with outwardly bent blocking ears 48 which abut against the edges of those flanges when the strut is fully extended as shown in FIGS. 1, 2, 5 and 6. A coil spring 49 encircles pivot pin 46 with its opposite end wires 51 and 52 received in corresponding holes in the adjacent flanges of the respective front and back strut legs to bias the strut to its fully extended condition.

Between the pivot support ears, a curved operating tongue 53 extends from the central web of the back leg strut and partially encircles pivot pin 46 and spring 49 with its convex surface in alignment with the arcuate edges of the pivot support ears. As shown in FIGS. 5 and 8, one edge of tongue 53 is spaced from the adjacent pivot support ear to provide clearance for the end wire 51 of spring 49 when the strut is collapsed to the condition shown in the latter figure.

The support strut is supported relative to the door 13 at the vertical center of the bellows camera by hinge pins 37, rigidly carried by pin support bosses 54, shown in FIGS. 2 and 8, which are integral with the inner side of the door. The bifurcated shape of the end of the front strut leg allows hinge fingers 36 to straddle the edge of the lens aperture so that the strut does not unnecessarily restrict the size of the lens. The hinge pin 42 at the opposite end of the strut is similarly supported between pin support bosses 55, shown in FIG. 2 and in broken lines in FIG. 8, which are mounted to the camera housing. When the strut is fully extended to locate the lens support door in its operative position as illustrated in FIGS. 1 and 2, the strut is substantially parallel to bellows end wall 19 and its operating tongue 53 is closely adjacent or in contact with the inner surface of that wall in alignment with the center of the vertical joint between the two rectangular wall sections 24 and 25. By reference to FIGS. 2 and 5, it will be seen that the central pivot pin 46 of the fully extended strut is located beyond an imaginary line passing through hinge pins at the ends of the strut. Therefore, the strut provides a toggle type linkage that cannot be collapsed by endwise pressure alone and which thereby positively prevents the door from moving toward its closed position until the photographer intentionally closes the camera.

Figure 3:
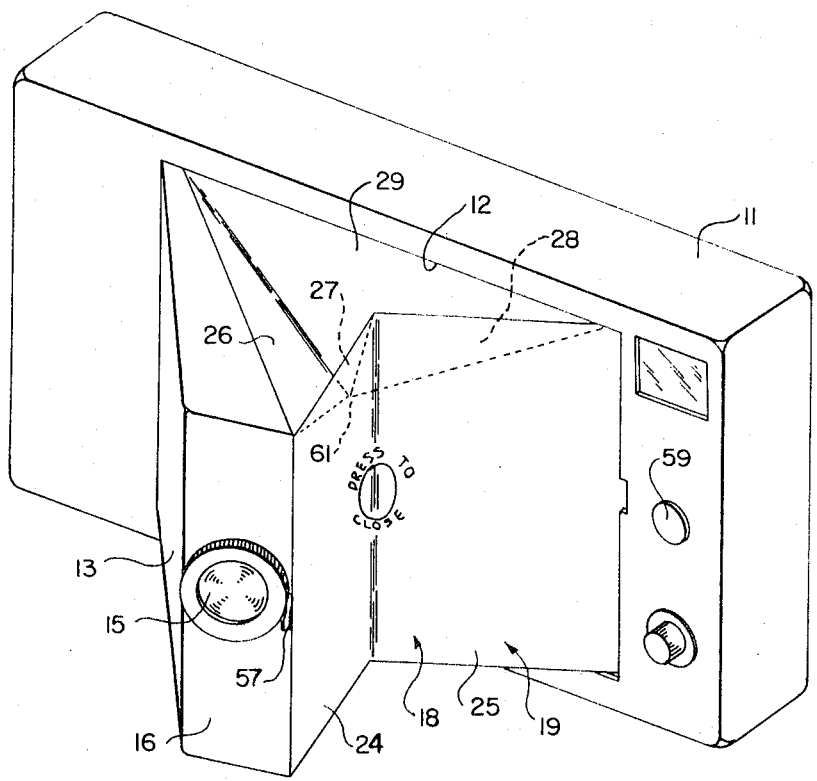
FIG. 3 is a perspective view of the illustrative camera with its lens support door partially closed.

To close the camera, the photographer presses inwardly on the center of bellows end wall 19 directly opposite the operating tongue 53 of the support strut. As shown in FIGS. 1 and 3, the proper place to press the bellows end wall is preferably identified by an appropriate mark or indicium which in the illustrative camera is represented by a circle 56 surrounded by the words "Press to Close." When the photographer thus flexes the center of the bellows end wall inwardly, the resulting pressure of the bellows wall against the smooth curved surface of operating tongue 53 causes the strut to partially fold so that pivot pin 46 moves past the imaginary line defined by hinge pins 37 and 42, whereupon the strut no longer positively resists being collapsed by endwise pressure. Accordingly, the lens support door can then be moved manually to its closed position shown in FIG. 3 simply by applying sufficient closing force to the door to overcome the relatively weak resistance of spring 49. When the lens support door is fully closed, a latch lug 57 (FIG. 2) adjacent lens 15 is engaged by a slidable spring loaded latch pawl 58, best shown in FIG. 2. The latch pawl therefore maintains the door in its closed position until the pawl is released by means of slide button 59 to allow spring 49 to return the door to its operative position.

As the door is being closed, the bellows end wall 18 folds inwardly toward the door hinge and the top and bottom bellows walls fold toward each other in the manner shown in FIG. 3. Because of the offset relation of the central strut pivot pin, the legs of the completely collapsed strut are in spaced parallel relation to each other as shown in FIG. 7; thereby allowing the folded bellows end wall to be accommodated between the strut legs without being pinched or abraded. As shown in FIG. 8, the central apexes 61 and 62 of the folded top and bottom bellows wall members are respectively located above and below the collapsed strut and are therefore likewise immune to being pinched or otherwise damaged by the strut.

The invention has been described in detail with particular reference to an illustrative preferred embodiment thereof, but it will be understood that variations and modifications can be effected within the spirit and scope of the invention as described hereinabove and as defined in the appended claims.

I claim:

1. A foldable camera for exposing photographic film, said camera comprising:

a housing including means for receiving the film and for defining an aperture through which the film is exposable;

a substantially rigid lens-supporting door having first and second ends, said first end being pivotally coupled to said housing adjacent said aperture for movement of said door between a closed position extending across said aperture and an open position extending away from said housing in oblique relation to said housing;

a lens carried by said second end of said door for effecting exposure of the film through said aperture in said housing when said door is in said open position;

a bellows coupled to said door and to said housing and establishing a light-tight chamber between said lens and said housing, said bellows having an expanded condition when said door is in said open position wherein said bellows defines two substantially flat sides of generally triangular configuration and a third substantially flat side of generally rectangular configuration, said bellows being foldable to a collapsed condition between said door and said housing when said door is moved to said closed position; and a single strut means extending inside said light-tight chamber along said third bellows side from said second end of said door adjacent said lens to said housing adjacent said aperture, said strut means having an extended condition for establishing said open position of said door and being collapsible by pressing on said strut means through said bellows.

2. A foldable camera as claimed in claim 1, wherein said third bellows side folds along a predetermined line centrally oriented relative to said third bellows side, and wherein said strut means is collapsible by pressing on said strut means through said bellows adjacent said centrally oriented fold line.

3. A foldable camera as claimed in claim 2, wherein said strut means comprises:

a substantially flat and elongated member having first and second rigid legs;

hinge means pivotally connecting said first and second legs to said housing and door, respectively, and pivotally connecting said first and second legs to each other, said hinge means providing for folding movement of said member between said extended condition and said collapsed condition, said legs in said extended condition being in generally endwise alignment with each other and when collapsed being generally parallel to each other.

4. A folding camera as claimed in claim 1, wherein said strut means is collapsible by releasing means comprising an operating surface on one of said legs, said operating surface being located adjacent an inside surface of said third bellows side when said strut means is in said extended position, whereby said strut means is collapsible by manual flexing of said third bellows side adjacent said operating surface into strut displacing engagement with said operating surface.

5. A folding camera as claimed in claim 4, wherein said third bellows side includes a central fold line dividing said third wall into two rectangular sections adapted to fold together generally toward said first end of said door and into generally parallel relationship, said strut means being pivotally collapsible adjacent said fold line to straddle said two sections of said third wall in said collapsed condition of said bellows.

6. A folding camera as claimed in claim 5, wherein said two triangular bellows sides each include bending lines defining a plurality of triangular bellows sections that permit folding of said triangular sides towards each other between said door and said housing when said door is moved to said closed position, said strut means extending in its collapsed condition between said folded triangular sides when said door is in said closed position.

* * * * *